April 26, 1960 G. M. SNYDER 2,933,860
AUTOMATIC MEANS FOR STARTING AND STOPPING CONTROL WHEELS
Filed Jan. 25, 1957 2 Sheets-Sheet 1

INVENTOR.
GLENN M. SNYDER
BY
ATTORNEY

April 26, 1960 G. M. SNYDER 2,933,860
AUTOMATIC MEANS FOR STARTING AND STOPPING CONTROL WHEELS
Filed Jan. 25, 1957 2 Sheets-Sheet 2
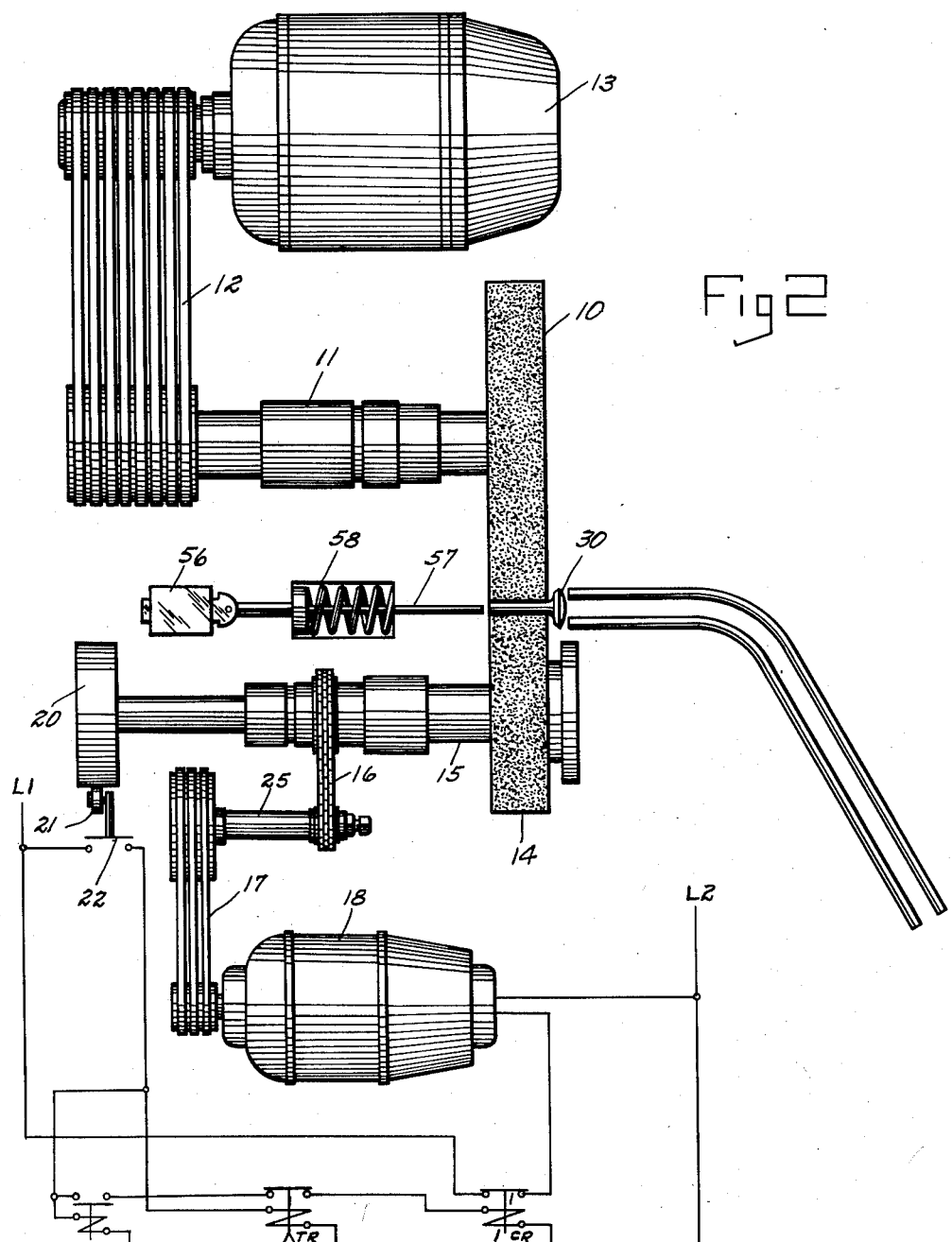
INVENTOR.
GLENN M. SNYDER
BY
*Hugh N Rocker*
ATTORNEY

United States Patent Office 2,933,860
Patented Apr. 26, 1960

2,933,860

AUTOMATIC MEANS FOR STARTING AND STOPPING CONTROL WHEELS

Glenn M. Snyder, Waynesboro, Pa., assignor to Landis Tool Company, Waynesboro, Pa.

Application January 25, 1957, Serial No. 636,391

7 Claims. (Cl. 51—103)

This invention relates to centerless grinders of the type wherein the grinding cycle is effected in timed relation with the rotation of the control wheel.

It is desirable to devote the maximum portion of the peripheral surface of the control wheel to rotation of the work during the grinding cycle. In the prior art, this has been accomplished by stopping the control wheel at the end of each rotation in order to remove a ground workpiece and insert an unground workpiece. The resumption of the rotation of the control wheel was effected by the operator. Another method of obtaining this result is disclosed in Patent 2,735,237, granted February 21, 1956. This patent discloses an automatic means for controlling the speed of a control wheel to reduce the speed substantially during that portion of the revolution at the end of one grinding cycle and the beginning of another. In this case, since the control wheel is rotated continuously, this movement could be used to actuate one control for reducing the speed of the control wheel and another control for resuming the higher speed of the control wheel. The present invention represents an improvement over the wheel slow down speed in that it stops the wheel at the end of each revolution and thus utilizes substantially the entire peripheral surface of the wheel to rotate the workpiece. In order to resume grinding speed of the control wheel automatically after an unground workpiece has been inserted, a novel electrical circuit is provided.

It is an object of this invention to provide means for stopping the control wheel at a predetermined point in its rotation and thereafter for automatically resuming rotation of said control wheel.

Figure 2 is a diagrammatic illustration of a centerless grinder with a circuit for controlling the rotation of the control wheel.

Figure 1:
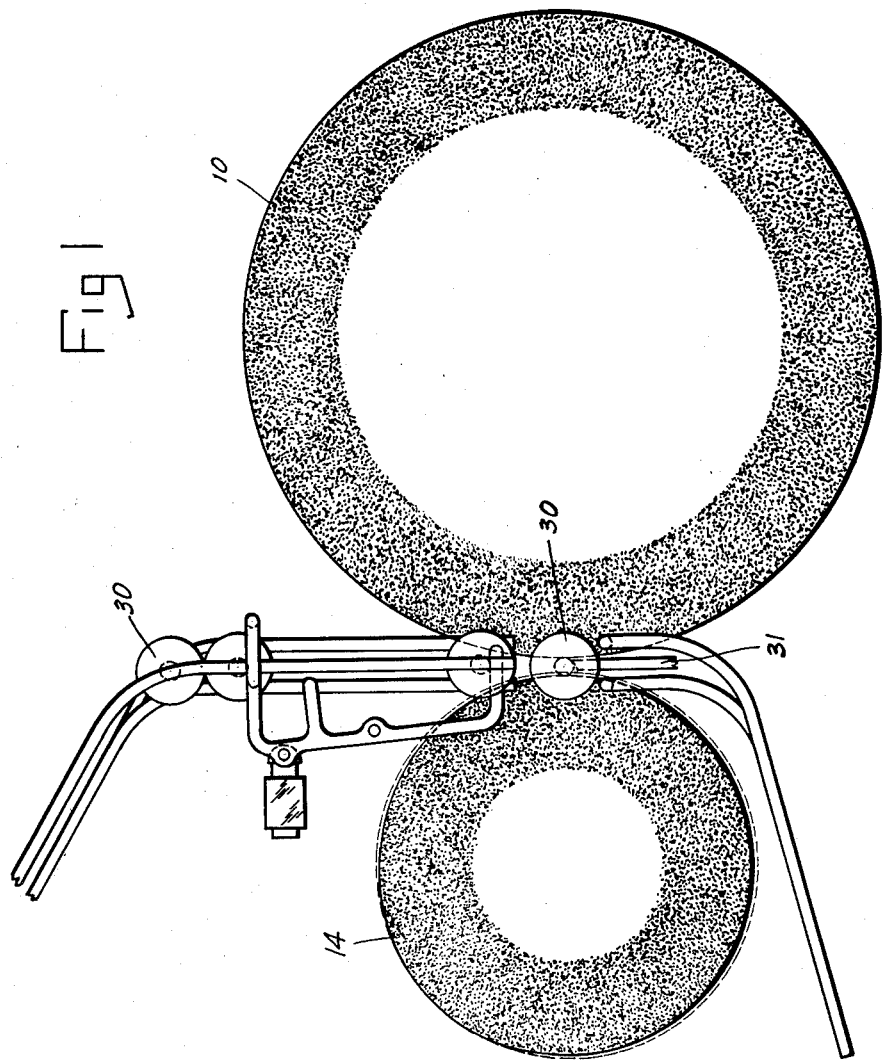
Figure 1 is a diagrammatic end elevation showing the relative position in a centerless grinder of the grinding wheel and a cam-shaped control wheel.

Numeral 10 indicates a grinding wheel for a centerless grinder rotatably mounted on spindle 11 and driven through a belt 12 by a motor 13. 14 is a control wheel peripherally opposed to said grinding wheel 10 and rotatably mounted on a spindle 15. Said spindle 15 is driven by a chain 16 from a jack shaft 25 which, in turn, is driven by a belt 17 from motor 18. A cam 20 on the end of said control wheel spindle 15 engages the roller 21 of a limit switch 22 which, in turn, actuates control elements TR and 1CR to stop and start motor 18.

The symbols and abbreviations used in this specification are listed as follows along with their definitions:

Symbol CR indicates a control relay.

A numeral before CR indicates a particular control relay.

A numeral after CR indicates a relay contact.

Symbol TR indicates a timing relay with numerals used the same way as symbol CR.

*Operation*

In the operation of this type of machine, the control wheel 14 is usually eccentric or cam-shaped and therefore as it rotates, it changes the width of the grinding throat and thus feeds a workpiece 30 on work rest 31 against the grinding wheel to an extent corresponding to the eccentricity or lift of the control wheel surface. Said control wheel is driven as described above by motor 18.

During a grinding cycle, control wheel motor 18 is energized by a circuit which includes a normally closed contact 1CR1. When the minimum diameter of the control wheel moves opposite the grinding wheel to permit ejection of a finished workpiece 30 and presentation of an unground workpiece for a grinding operation, cam 20 closes switch 22 to energize 2CR and TR which are connected in parallel. 2CR1 closes to complete a circuit through normally closed TR1 to energize 1CR. Normally closed 1CR1 opens to stop said control wheel motor 18 to permit the ejection of a ground workpiece 30 by ejector plunger 57 and the insertion of an unground workpiece. After a predetermined interval sufficient to permit the change in workpieces, TR1 times open, deenergizing 1CR which permits 1CR1 to close, completing a circuit to control wheel motor 18 which resumes the rotation of the control wheel to start another grinding cycle.

I claim:

1. A centerless grinder having a grinding wheel, a cam-shaped control wheel for feeding and rotating a workpiece for each revolution of said control wheel, a motor for driving said control wheel in a single forward direction, an electric circuit for said motor, a cam rotatable with said control wheel, a switch actuated by said cam for interrupting said motor circuit and a time delay switch actuated by said circuit switch for restoring the circuit for the motor and starting it in the same direction after a predetermined interval.

2. A centerless grinder having a grinding wheel, a cam-shaped control wheel for feeding and rotating a workpiece for each revolution of said control wheel, a motor for driving said control wheel in a single forward direction, an electric circuit for said motor, a cam rotatable with said control wheel, a switch actuating member rotatable with said control wheel, a switch actuated by said member for interrupting said motor circuit and a time delay switch actuated by said circuit switch for restoring the circuit for the motor and starting it in the same direction after a predetermined interval.

3. A centerless grinder having a grinding wheel, a control wheel for feeding and rotating a workpiece for each revolution of said control wheel, a motor for driving said control wheel in a single forward direction, an electric circuit for said motor, a cam rotatable with said control wheel, a main control switch actuated by said cam, branched circuits from said main control switch, a normally closed relay in one branch actuated by said main control switch to interrupt the motor circuit and a time delay relay in the other branch to restore the motor circuit after a predetermined period.

4. A centerless grinder having a grinding wheel, a cam shaped control wheel for feeding and rotating a workpiece, a motor for driving said control wheel in a single forward direction, an actuating member rotatable with said control wheel, means actuated by said actuating member for stopping said motor with said control wheel in a predetermined angular position, and time controlled means for causing the motor to run again in the same direction after a predetermined interval.

5. A centerless grinder having a grinding wheel, a control wheel for feeding and rotating a workpiece, a motor for driving said control wheel, an actuating member rotatable with said control wheel, a circuit to said motor including a relay having a normally closed contact, a branched control circuit relay having a normally closed time delay contact and a parallel normally open contact in the circuit to said first mentioned relay contact, means actuated by said actuating member for energizing said time delay contact and said normally open contact to complete a circuit through said normally closed time delay contact to denergize said first mentioned relay to open the circuit to said motor, and stop said control wheel, said time delay contact being effective to open said normally closed contact after a predetermined interval to deenergize said first mentioned relay to start said motor again in the same direction.

6. In a centerless grinding machine having a grinding wheel, a cam-shaped control wheel for feeding and controlling rotation of a workpiece, a motor for driving said control wheel, a cam rotatable with said wheel, a circuit for supplying power to said motor, a relay having a normally closed contact in said circuit, a second circuit for operating said relay, a normally open contact in said second circuit, a normally closed time delay contact in said second circuit, a switch in said second circuit, said cam being operable when the minimum diameter of the control wheel moves opposite the grinding wheel to actuate said switch to close said normally open contact whereby to complete a circuit through said time delay contact to energize said first mentioned relay and to open said normally closed contact of said first mentioned relay to stop said motor, said time delay contact being arranged to open after a predetermined interval whereby to deenergize said first or motor control relay to close said normally closed contact to resume rotation of said motor and said control wheel in the same direction.

7. A centerless grinder having a cam-shaped control wheel for feeding and controlling rotation of a workpiece, a driving motor and circuit having a relay-operated, normally closed stop switch, means for stopping said control wheel to remove a finished workpiece and insert an unfinished workpiece including a cam rotatable with said control wheel, a timing relay, a switch in said relay circuit actuated by said cam, said timing relay having a normally closed contact, a relay having a contact in the circuit with said timing relay contact which closes immediately to complete a circuit through said stopping relay, said normally closed contact in the timing relay opening after a predetermined period to deenergize said stopping relay and to permit the contact of said stopping relay to re-close and start the rotation of the control wheel, said cam operated switch being opened by rotation of said control wheel to open the circuit to the timing relay for resetting said relay.

References Cited in the file of this patent

UNITED STATES PATENTS

| | | |
|---|---|---|
| 2,147,891 | Graf et al. | Feb. 21, 1939 |
| 2,427,283 | Hopkins et al. | Sept. 9, 1947 |
| 2,735,237 | Balsiger | Feb. 21, 1956 |